Dec. 29, 1936.  A. S. VAN HALTEREN  2,065,633
WHEEL BALANCING DEVICE
Filed May 17, 1934
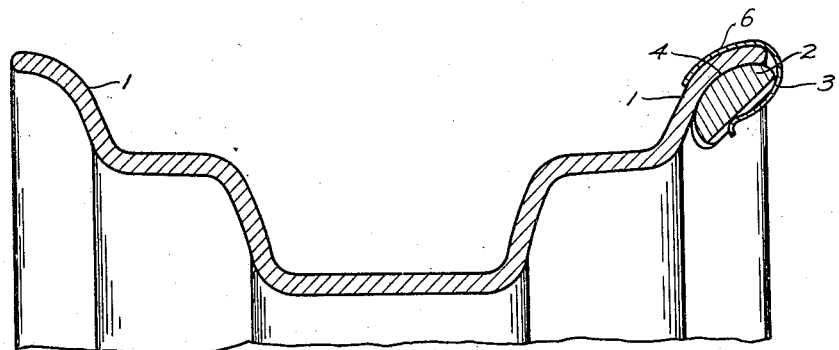
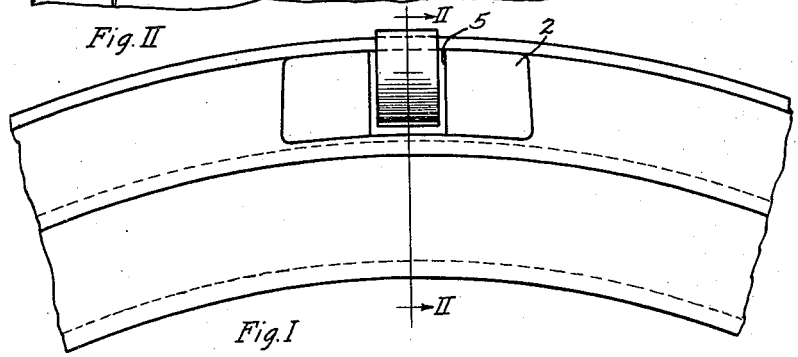
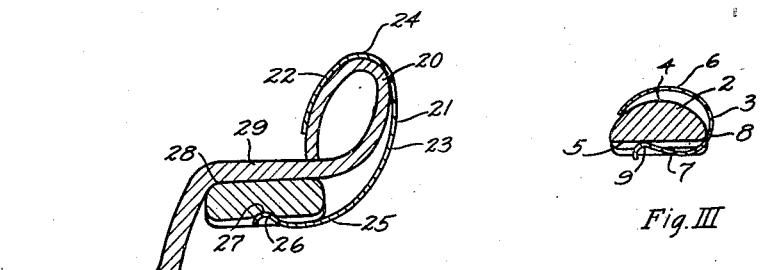
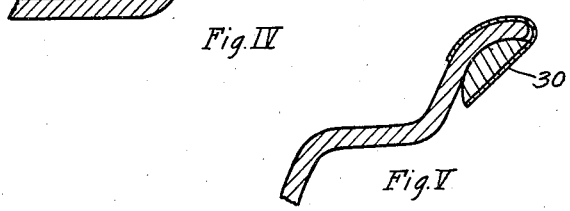
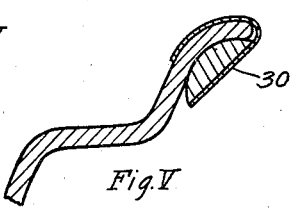
INVENTOR.
Andrew S. Van Halteren
BY Carroll R. Taber
HIS ATTORNEY.

Patented Dec. 29, 1936

2,065,633

UNITED STATES PATENT OFFICE 2,065,633

WHEEL BALANCING DEVICE

Andrew S. Van Halteren, Lansing, Mich., assignor to Motor Wheel Corporation, Lansing, Mich., a corporation of Michigan Application May 17, 1934, Serial No. 726,073

6 Claims. (Cl. 301—5)

This invention relates generally to balancing devices and particularly concerns a novel device which is adapted to be applied to the outer extremities of a vehicle wheel.

An automobile wheel usually becomes out of balance after it has been subjected to hard usage for some time. This may be due to a tire in which the tread thereof has not worn true; or may be the result of a damaged wheel body, or otherwise. Consequently, when operated at high speeds the movement of the wheel is not uniform and bounces along causing considerable vibration and damage to the automobile in general.

The present invention is primarily designed to overcome the above disadvantage, and involves the provision of a device preferably consisting of a weight, and a ring or clamp member which is adapted to substantially encircle and engage a portion of the wheel rim and the weight in order to hold the latter in operative relation to the rim. The tire may be utilized to hold the device in place after it has been adjusted to the desired position.

One particular object of the invention is to design and construct the weight member so that it will substantially conform to the curvature or contour of a rim or felloe, and preferably fit or nest within a cove or other concave formation of the rim in order that the same may be positioned substantially within the confines of the rim, thus avoiding any outwardly extending projections.

Another important object is to provide a device that is adapted to be located on the wheel rim in such a manner that the centrifugal force produced when the wheel is rotating assists in holding the device in position.

A further object of the invention is to design and construct a wheel balancing device of the kind described in which the ring is capable of receiving weights of varying size and formation. The device is also preferably of such a character that it may be easily and quickly installed and removed or shifted to any desirable position on the periphery of the wheel.

Various other objects and advantages of the invention will appear after considering the drawing hereunto annexed in connection with the description hereinafter set forth.

Referring to the drawing:

Figure I is a side view showing a portion of a wheel rim in elevation with the wheel balancing device applied thereto;

Figure II is a section taken on line II—II of Figure I showing more in detail the normal position of the weight and the manner of connecting it to the rim of the wheel;

Figure III is a sectional view showing the parts of the wheel balancing device in assembled relation prior to being attached to the vehicle wheel;

Figure IV is a sectional view similar to Figure II, and illustrates a modified construction; and Figure V is a sectional view similar to Figure II and IV, and illustrates another embodiment to which the invention is susceptible.

The preferred embodiment of the wheel balancing device is disclosed in Figures I, II, and III. As there shown, the balancing device is applied to a vehicle wheel rim of the so-called drop center type. Of course the device may by obvious changes be adapted for application to any type of rim or felloe.

The sides of the rim are flared upwardly and outwardly as indicated at 1 and form coves or grooves adjacent the edges thereof. The weight 2 for balancing the wheel is preferably held in relation to the rim of the wheel by means of a ring or champ 3. The weight is preferably elongated and substantially semi-circular in cross section in order that the convex side 4 thereof may conform to the curvature or contour of the rim. A groove or rebate is preferably formed in the substantially flat side of the weight intermediate its ends so as to provide a seat 5 for the reception of one end of the clamp. When one end of the clamp is arranged in the seat the weight is prevented from sliding out from under the clamp.

The clamp 3 is preferably made from a strip of resilient material, and constructed so that one portion will engage the weight and another portion will normally engage a part of the rim. The clamp may be of any desired shape, but as here shown is more or less U-shaped and comprised of portions 6 and 7 connected together by an intermediate portion 8. The portion 7 is provided with a projection 9 and the two are so designed with respect to each other, that the projection 9 engages the seat 5 when the weight is normally secured to the rim. The portion 8 of the ring also normally engages the weight to provide a two-point contact between the ring and weight.

From the foregoing description it will be apparent that the balancing device may be readily installed or removed and may be shifted to any desired position on the rim after it has been installed. The device is mounted on the rim 1, as shown in Figure II by first applying the ring 3 thereto and thereafter inserting the weight 2 beneath the portion 7 and projection 9 of the ring from one side of the ring. To remove the balancing device, the weight 2 is first withdrawn from the ring by sliding it sidewise. The ring is then sufficiently loose on the rim to permit its removal therefrom.

It is to be observed that the weight is preferably designed so that when it is normally applied to the rim of a wheel, the line of contact between the weight and rim, and the line of contact between the portion 6 of the ring and the rim will be substantially parallel in order to insure a good clamping effect. It is to be particularly noted that the device is of such a character that it is not necessary to deform or otherwise provide means on the rim whereby to receive or support the weight, and will not in any way injure the rim or tire.

In the modified embodiment of the invention clearly shown in Figure IV, the wheel rim is provided with beads 20 adjacent the edges thereof. The clamping ring 21, as here shown is preferably ear-shaped and comprised of portions 22 and 23 joined together by an intermediate portion 24 in order to form a loop adapted to encircle one of the beads 20 provided on the rim. The portion 25 of the ring is provided with a lobe or projection 26 which is adapted to normally engage a seat 27 provided adjacent one side of the weight 28. Thus one end of the ring is adapted to engage the weight, and the other end, a portion of the rim, preferably at 29. The portion 25 is preferably formed so that the projection 26 will be the only part to engage the weight.

In the embodiment shown in Figure V the end 30 of the ring is made substantially flat, and is adapted to engage a substantially flat countersunk seat provided in the weight. In this device there is a considerable area of contact between the weight and the flat end 30 of the ring.

In view of the foregoing it will be evident that a weight conforming substantially to the contour of curvature of a wheel rim is adapted to be applied and held in relation thereto by means of a clamping ring. It is also apparent that the device is comprised of but two parts which may be economically manufactured on a commercial scale. Furthermore, the device may be easily and quickly applied or removed with respect to a rim with or without the use of a suitable tool before or after the tire has been placed on the rim. It is to be understood that it is within the contemplation of the present invention that any form of weight or ring member may be employed providing the clamping member is adapted to force a weight against a portion of a rim. The tire serves to firmly hold the balancing device in relation to the rim after it has been adjusted to the desired position. However, because of the effect of centrifugal force on the weight when the wheel is rotated, the clamp itself is sufficient to hold the weight in position. If found desirable the weight may be provided with a cam face or other formation, whereby one end or portion of the resilient ring may be arranged to engage the face or urge the weight in snug relation to the rim.

I claim:—

1. The combination of a wheel rim provided with a cove, a weight having a face of a configuration substantially corresponding to the cove and arranged within the confines thereof, a depression providing a seat in one side of the weight, and a resilient ring member of substantially U-shape having a portion adapted to engage one side of the rim and encircle the edge thereof and a portion arranged in spaced relation to the rim and weight and terminating in a projection engaging the seat in the weight to hold the latter in a fixed relation to the rim.

2. The combination with a wheel rim having a side flange of a balancing instrumentality comprising a weight and a resilient clip, the weight formed to lie along the outer side of said flange and provided with a transverse groove, the clip having one end formed for engagement with the inside of the flange and its other end adapted to be pressed into said groove whereby the resilient engagement of the weight by the clip constitutes the sole means for holding the weight in place.

3. The combination with a wheel rim having a side flange of a balancing instrumentality comprising a weight and a resilient clip formed as separate units, the clip adapted to be installed on the rim with one end engaging the inner surface thereof and the other end extending in spaced relation to the outer surface, the weight adapted to be installed on the rim by pressing the same circumferentially between the outside of the flange and the outer end of the clip, the weight having a depression to receive the outer end of the clip when installed.

4. The combination with a wheel rim having a side flange of a balancing instrumentality comprising a weight and a spring clip formed as separate units, the clip formed to be mounted on the flange with one end engaging the inner surface thereof and the other end extending in spaced relation to the outer surface, the weight formed to lie along the outer side of the flange and of a thickness greater than the space between the flange and the outer end of the clip, the outer end of the clip adapted to be sprung away from the flange to permit the insertion of the weight between said end and the flange, the weight provided with a depression to receive the outer end of the clip when positioned between said end and the flange.

5. A balancing instrumentality for vehicle wheels adapted to be secured along the tire rim flange comprising a weighted body, a separable attachment portion, and a recess defined by said body for receiving one end of said attachment portion, said attachment portion having such a configuration that when in operative position it embraces said rim and body.

6. A balancing instrumentality for vehicle wheels adapted to be secured along a tire rim flange comprising a weighted body, a recess defined by said body portion, a separable attachment portion for securing said body to said flange, and a deflected portion on said attachment portion for engagement with said recess.

ANDREW S. VAN HALTEREN.